US006920386B2

United States Patent
Super et al.

(10) Patent No.: US 6,920,386 B2
(45) Date of Patent: Jul. 19, 2005

(54) METHOD AND SYSTEM FOR INDIRECTLY ESTIMATING AMBIENT AIR TEMPERATURE

(75) Inventors: Leopold Super, Dearborn, MI (US); Richard M. Avery, Jr., West Bloomfield, MI (US); John E. Longnecker, Livonia, MI (US)

(73) Assignee: Detroit Diesel Corporation, Detroit, MI (US)

( * ) Notice: Subject to any disclaimer, the term of this patent is extended or adjusted under 35 U.S.C. 154(b) by 70 days.

(21) Appl. No.: 10/675,762

(22) Filed: Sep. 30, 2003

(65) Prior Publication Data

US 2005/0071074 A1 Mar. 31, 2005

(51) Int. Cl.[7] .............................................. G06F 19/00
(52) U.S. Cl. ......................... 701/101; 701/105; 60/599
(58) Field of Search ............................... 701/101–105, 701/113; 60/599, 602, 605.2

(56) References Cited

U.S. PATENT DOCUMENTS

| 5,732,676 A | * | 3/1998 | Weisman et al. | ............ 123/436 |
| 6,026,784 A | * | 2/2000 | Weisman et al. | ............ 123/436 |
| 6,088,661 A | | 7/2000 | Poublon | |
| 6,327,980 B1 | * | 12/2001 | Chen et al. | ............... 105/26.05 |
| 6,671,614 B2 | * | 12/2003 | Weisman et al. | ............ 701/115 |
| 2001/0021893 A1 | * | 9/2001 | Weisman | ..................... 701/114 |
| 2004/0184509 A1 | | 9/2004 | DeRonne et al. | |

FOREIGN PATENT DOCUMENTS

EP       1 170 165 A3       7/2004

* cited by examiner

*Primary Examiner*—John T. Kwon
(74) *Attorney, Agent, or Firm*—Brooks Kushman P.C.

(57) ABSTRACT

A method and system for indirectly estimating ambient air temperature. The ambient air temperature is estimated based on filtering a temperature input from a turbocharger air inlet sensor. The filtering includes compensating for engine compartment temperature variations which vary relative to the actual ambient temperature.

20 Claims, 2 Drawing Sheets

METHOD AND SYSTEM FOR INDIRECTLY ESTIMATING AMBIENT AIR TEMPERATURE

BACKGROUND OF THE INVENTION

1. Field of the Invention

The present invention relates generally to temperature estimation, and in particular, to estimating ambient air temperature with an engine control module when ambient temperature sensors are unavailable.

2. Background Art

Engines, such as compression-ignition engines, are used in a number of applications, from industrial to automotive. Many of the engines, especially in automotive applications, include an engine control module.

The engine control module relies on a number of inputs to make calculations and to perform other tasks. The ability to make desired calculations can be effected by failure of the inputs sources, which commonly are sensors, or simply by the failure to provide any input at all for making the desired calculation.

As such, it is desirable to provide the engine control module with the ability to make the desired calculation from the inputs actually available to the engine control module, even if the available inputs are not directly related to the desired calculation. Such calculations are commonly referred to as indirect estimates as they are based on indirect inputs, and not inputs directly related to the calculation.

Automotive manufacturers, for example, will not typically provide an ambient air temperature sensor for directly sensing ambient air temperature outside of the engine compartment. Consequently, engine control module manufacturers are forced to provide engine control modules with an ability to indirectly estimate the ambient air temperature from the inputs which are available the engine control module.

SUMMARY OF THE INVENTION

It is, therefore, an object of the present invention to indirectly estimate ambient air temperature using inputs commonly provided for use by an engine control module.

One embodiment of the present invention relates to a method for indirectly estimating ambient air temperature in a vehicle having an engine and a turbocharger. The method is preferably executed by an engine control module in accordance with programmable software instructions inputted therein. Generally, the method relates to indirectly estimating ambient air temperature from a sensor, or other engine compartment device, without directly sensing the actual ambient air temperature outside of the engine compartment.

In one embodiment of the present invention, the method is provided for indirectly estimating ambient air temperature by filtering a temperature sensed by a turbocharger air inlet temperature sensor. The method is referred to as an indirect estimation of ambient air temperature because the temperature sensed by the turbocharger air intake sensor is indirectly related to the ambient air temperature, as opposed to a sensor located outside of an engine compartment which directly senses ambient air temperature.

The method preferably includes estimating ambient air temperature by filtering the sensed turbocharger air intake temperatures. Preferably, the filtering compensates for engine compartment temperature variations which vary relative to actual ambient air temperature. The filtering generally comprises adding a temperature filtering value to the sensed turbocharger air inlet temperature, the resulting filtered value being the estimated ambient air temperature.

The filtering value can be based on engine speed to compensate for engine compartment temperature variations due to driving the vehicle, which generally are due in part to air flow through the engine compartment from the moving vehicle cooling or failing to coot the engine compartment.

The filtering value can be further based on fan usage to compensate for engine compartment temperature variations due to fan operation, which generally are due in part to a fan cooling or failing to cool the engine compartment.

The method preferably further includes periodically updating the filtered ambient air temperature estimate at predefined time intervals based on a difference between first and second filtered ambient air temperature estimates. Preferably, the updating includes adding a temperature update value to the first filtered ambient air temperature estimate, the update value corresponding to the difference between the first and second filtered ambient air temperature estimates.

The method preferably includes limiting the increase or decrease of the updated ambient air temperature estimate based on a maximum percentage increase per wait period. This is done to insure that instantaneous engine compartment temperature variations do not overly effect the ambient air temperature estimation, as the ambient air temperature is not likely to dramatically change.

The method preferably further includes freezing the ambient air temperature estimate if an engine load exceeds an engine load limit for a predetermined period of time. This is done to limit improper ambient air temperature estimates which can occur when the turbocharger is operating in conjunction with the engine under high load conditions. Preferably, the frozen ambient air temperature estimate is increased or decreased in temperature based on changes in barometric pressure.

One embodiment of the present invention relates to a system for implementing the method described above. The system includes a turbocharger air inlet sensor and an engine control module. The engine control module includes programmable instructions for estimating ambient air temperature based on filtering a sensed turbocharger air inlet temperature.

DETAILED DESCRIPTION OF THE PREFERRED EMBODIMENT(S)

Figure 1:
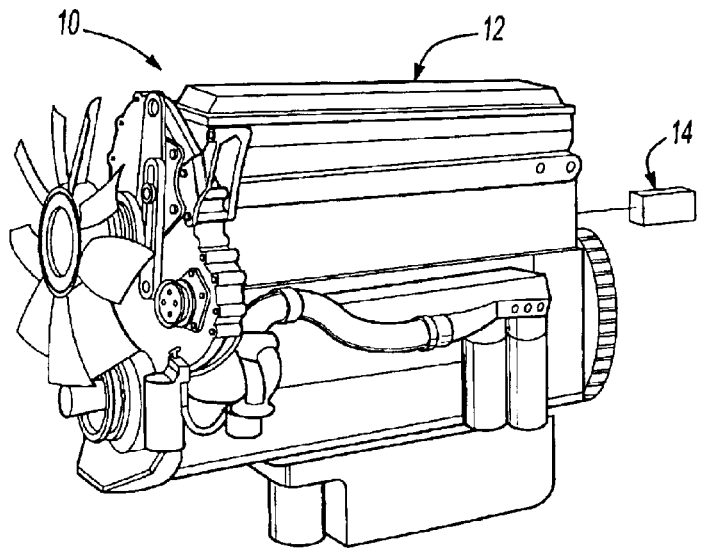
FIG. 1 illustrates a perspective view of a compression-ignition engine incorporating various features of the present invention.

FIG. 1 is a perspective view of a compression-ignition, internal combustion engine 10 incorporating various features of engine control according to the present invention. As will be appreciated by those of ordinary skill in the art, engine 10 may be used in a wide variety of equipment for applications including on-highway trucks, construction equipment, marine vessels, and generators, among others.

Engine 10 includes a plurality of cylinders disposed in an engine block, indicated generally by reference numeral 12. In a preferred embodiment, engine 10 is a multi-cylinder compression-ignition internal combustion engine, such as a 4, 6, 8, 12, 16, or 24 cylinder diesel engine, for example.

While the present invention is described with reference to a diesel engine, one of ordinary skill in the art will recognize that the present invention is not necessarily limited to compression-ignition engines and may be easily applied to a variety of internal combustion engine technologies.

Engine 10 includes an engine control module (ECM) 14. In operation, the engine control module 14 receives signals from various vehicle sensors and executes control logic embedded in hardware and/or software to control the engine 10. In a preferred embodiment, the engine control module 14 is a DDEC controller available from Detroit Diesel Corporation, Detroit, Mich. Various other features of this control module are described in detail in a number of different U.S. patents assigned to Detroit Diesel Corporation.

Figure 2:
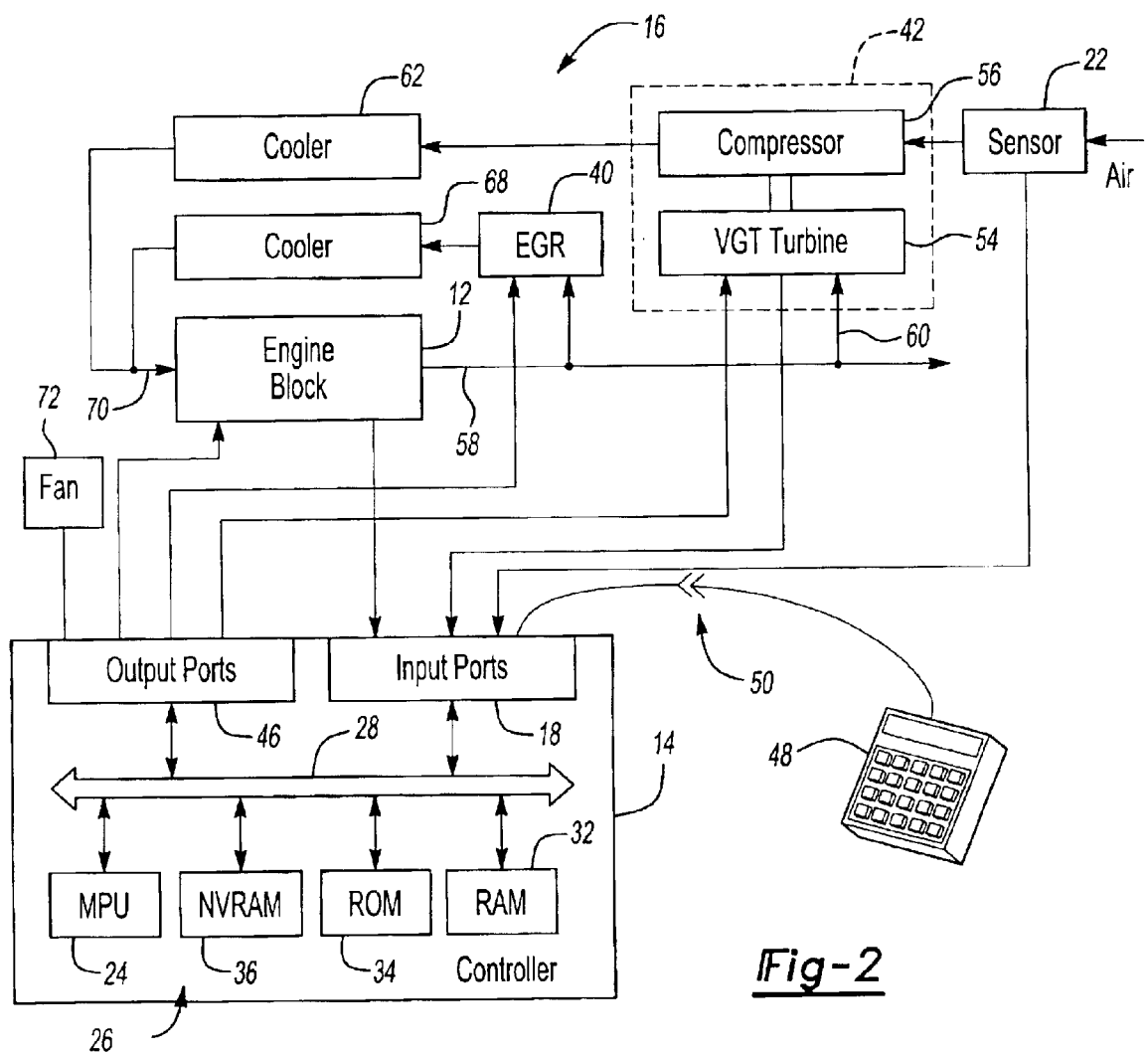
FIG. 2 illustrates an exemplary control schematic for the combustion-ignition engine including an engine control module for controlling the engine based on an estimated ambient air temperature.

FIG. 2 illustrates an exemplary control schematic for the combustion-ignition engine including associated control systems and subsystems, generally indicated at 16. In a preferred embodiment, engine block 12 corresponds with a compression-ignition internal combustion engine, such as a heavy duty diesel fuel engine. Engine 12 includes an a plurality of cylinders. The cylinders receive pressurized fuel from a fuel supply in a known manner. Block 12 represents intake and exhaust manifolds and valves, as well as other standard engine components in addition to representing the engine block.

Various sensors are in electrical communication with an engine control module 14 via input ports 18, including turbocharger air inlet sensor 22. Engine control module 14 preferably includes a microprocessor 24 in communication with various computer readable storage media 26 via data and control bus 28. Computer readable storage media 26 may include any of a number of known devices which function as read only memory 32, random access memory 34, and non-volatile random access memory 36.

Computer readable storage media 26 have instructions stored thereon that are executable by engine control module 14 to perform methods of controlling the internal combustion engine, including exhaust gas recirculation (EGR) valve 40 and turbocharger 42.

The program instructions direct engine control module 14 to control the various systems and subsystems of the vehicle, with the instructions being executed by microprocessor 24. Input ports 18 receive signals from various sensors, and engine control module 14 generates signals at output ports 46 that are directed to the various vehicle components.

A data, diagnostics, and programming interface 48 may also be selectively connected to engine control module 14 via a plug 50 to exchange various information therebetween. Interface 48 may be used to change values within the computer readable storage media 26, such as configuration settings, and/or calibration variables.

As is appreciated by one of ordinary skill in the art, control logic may be implemented in hardware, firmware, software, or combinations thereof. Further, control logic may be executed by engine control module 14, in addition to by any of the various systems and subsystems of the vehicle cooperating with engine control module 14. Further, any of a number of known programming and processing techniques or strategy may be used to control an engine in accordance with the present invention.

Turbocharger 42 includes a turbine 54 and a compressor 56. The pressure of the engine exhaust gases causes the turbine to spin. The turbine drives the compressor, which is typically mounted on the same shaft. The spinning compressor creates turbo boost pressure which develops increased power during combustion. The exhaust gases pass from engine 12 through exhaust passage 58 and are selectively routed to turbine 54 at inlet 60.

An exhaust gas recirculation system introduces a metered portion of the exhaust gases into the intake manifold. The EGR system dilutes the incoming fuel charge and lowers combustion temperatures to reduce the level of oxides of nitrogen. The amount of exhaust gas to be recirculated is controlled by EGR valve 40. It is appreciated that embodiments of the present invention may be employed in engines with or without an EGR system.

In some embodiments, it may be desirable to provide a cooler 62 to cool the charge air coming from compressor 56. Similarly, in some embodiments, it may be desirable to provide a cooler 68 to cool the flow through the EGR system prior to reintroduction to engine 12 of the gases at intake passage 70. Still further, the engine control module 14 can be used to control and monitor operation of a cooling fan 72.

Figure 3:
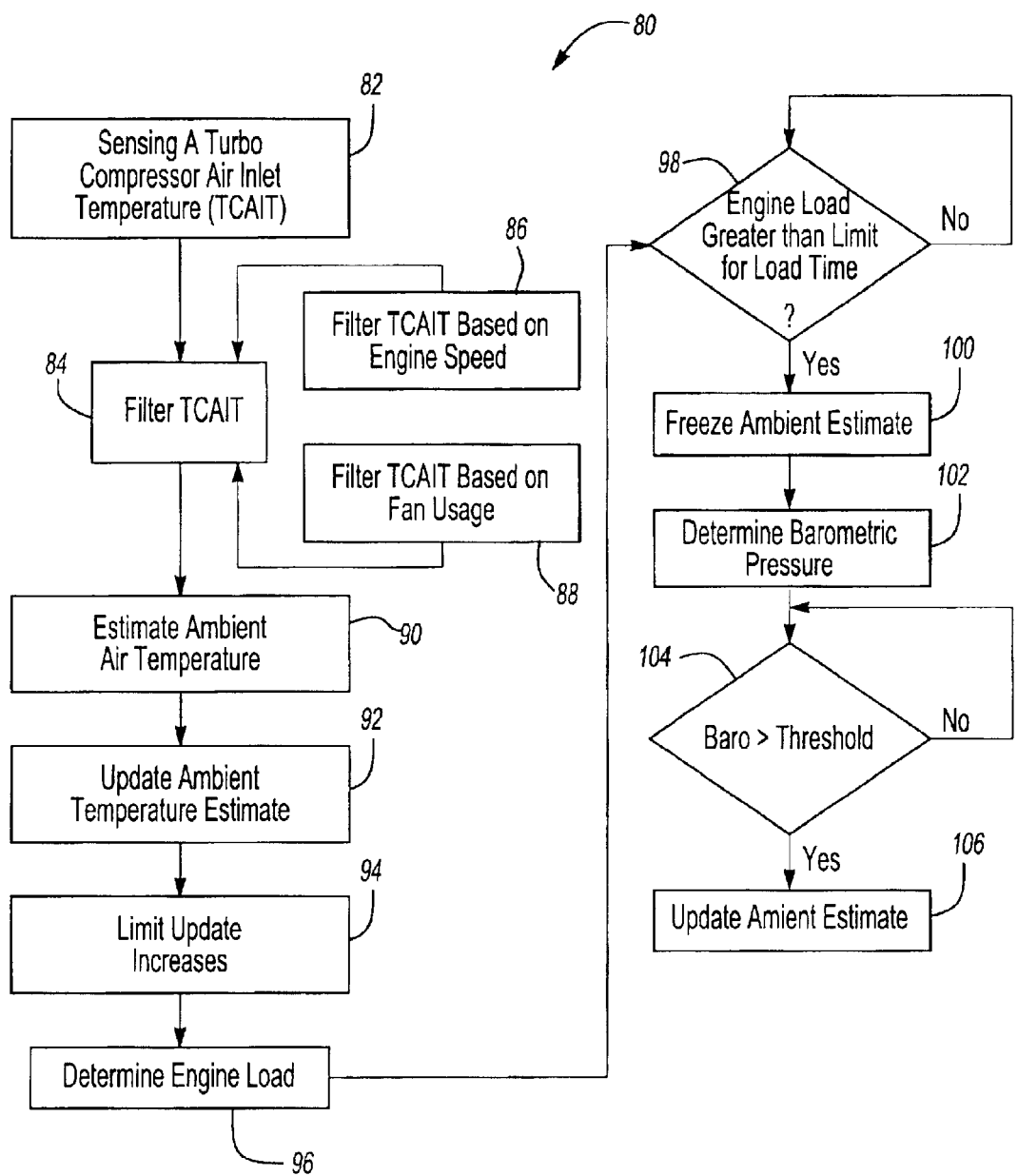
FIG. 3 illustrates an exemplary control arrangement for execution by the engine control module to estimate the ambient air temperature without sensing the ambient air temperature.

FIG. 3 illustrates an exemplary control arrangement 80. The method is preferably executed by engine control module 14 in accordance with programmable software instructions inputted therein. Generally, the control relates to indirectly estimating ambient air temperature based on data provided to engine control module 14 from turbocharger air inlet temperature sensor 22.

In this manner, the ambient air temperature can be indirectly estimated using a sensor within the engine compartment of a vehicle and without directly sensing the ambient air temperature outside of the engine compartment. This permits an input to engine control module 14 to be used for receiving other sensory inputs. In addition, for engine control modules with inputs already assigned to an ambient air temperature sensor, the software means can be a back-up redundancy system for failure of the ambient air temperature sensor. Preferably, the software estimation can be easily programmed into new and after market engine control modules and optionally used if the ambient temperature sensor should fail or need calibration.

A block 82 relates to sensing a turbocharger air inlet temperature (TCAIT). Generally, this is accomplished with sensor 22 sensing the intake air temperature, as understood by one skilled in the art.

The heat generated from the engine and its other moving components produce engine compartment temperature variations which vary the engine compartment temperature relative to the actual ambient air temperature. The variations can effect the ability of the turbocharger air intake sensor to be consistently used for indirectly estimating the actual ambient air temperature. As such, prior to permitting the engine control module 14 to use the temperature sensed by the sensor 22, the present invention estimates the ambient air temperature by filtering the sensed temperatures.

A block 84 relates to filtering the temperature sensed in block 82. The filtering generally relates to adding a temperature filtering value to the sensed turbocharger air inlet temperature. The filtering value preferably compensates the temperature sensed by the sensor 22 relative to the engine compartment temperature variations which cause the sensors in the engine compartment to vary relative to actual ambient air temperature. Meaning, the filtering at least provides a means to make adjustments based on the heat generated in the engine compartment from operation of the vehicle.

A block 86 relates to determining the filtering value based in part on engine speed. The engine speed based filter is used to compensate for engine compartment temperature variations caused by air flow through the engine compartment while the vehicle moves. Typically, the filtering value is determined from a look-up table or algorithm stored in memory of the engine control module 14. Preferably, it is a percentage value which increases or decreases the temperature from block 82.

A block 88 relates to determining the filtering value based in part on fan usage. The fan based filter is used to compensate for engine compartment temperature variations caused by air flow through the engine compartment due to operation of an engine fan. Preferably, the compensation is based on a speed of the fan and its duration of use. Like the value from block 86, the fan usage filtering value is determined from a look-up table or algorithm stored in memory of the engine control module 14. Preferably, it is a percentage value which further increases or decreases the temperature from block 82 after it has been reduced by the percentage from block 86.

A block 90 relates to outputting an estimated ambient temperature. This estimation can then be used by engine control module 14 to control the vehicle or the engine. Preferably, the ambient air temperature estimation is used to regulate the emissions control strategy to maximize engine performance while still meeting emissions regulations. The temperature from block 90 is thus a filtered ambient air temperature estimate.

A block 92 relates to periodically updating the ambient air temperature estimate at predefined time intervals. Preferably, the updated ambient air temperature estimate is determined by adding a temperature update value to the ambient air temperature estimate from block 90.

The temperature update value generally corresponds to a difference in temperature between the filtered ambient air temperature estimate from block 90 and a subsequently and similarly filtered ambient air temperature estimate. In other words, the temperature update value corresponds to a difference in temperature between first and second filtered ambient air temperature estimates, estimated in accordance with blocks 82 through 90. Preferably, the updated ambient air temperature estimate is determined by adding a temperature update value to the temperature value from block 90.

The temperature update value preferably is a percentage value for increasing or decreasing the temperature value from block 90 based on a maximum percentage increase per weight. This is done to ensure instantaneous engine compartment temperature variations do not overly affect the ambient air temperature estimation, as the ambient air temperature is not likely to dramatically change.

A block 96 relates to determining an engine load. The engine load indicates the amount of work being done by the turbocharger and the engine. Generally, the greater the load the greater the engine and turbocharger temperature. Because the turbocharger air inlet sensor is proximate the turbocharger, and within the engine compartment, the increase heat can effect the accuracy of the estimation determined according to blocks. As shown, engine load is determined, however, a turbocharger load could also be used, as one of ordinary skill in the art will appreciate.

Blocks 98 and 100 relate to freezing the ambient air temperature estimate if an engine load exceeds an engine load limit for a predetermined period of time. This is done to limit improper ambient air temperature estimates which can occur when the turbocharger and engine are operating under high load conditions.

Blocks 102, 104, and 106 relate to updating the frozen ambient air temperature estimate according to barometric pressure. This is done to take advantage of government emissions regulations which vary with altitude. The updates are made by storing the barometric pressure occurring proximate in time to freezing the ambient air temperature estimate at block 102. Then, the frozen ambient air temperature is increased or decreased therefrom at block 104 if the barometric pressure changes positively or negatively more than a predefined threshold. Generally, the frozen temperature is increased if the barometric pressure increases and decreased if the barometric pressure decreases.

As described above, the present invention eliminates the need for an ambient air temperature input to an engine control module by providing a system and method for indirectly estimating ambient air temperature. While the best mode for carrying out the invention has been described in detail, those familiar with the art to which this invention relates will recognize various alternative designs and embodiments for practicing the invention as defined by the following claims.

What is claimed is:

1. A method for indirectly estimating ambient air temperature, the method being for use with a vehicle having an engine and a turbocharger, the method comprising:
    sensing a first turbocharger air inlet temperature;
    indirectly estimating a first ambient air temperature by filtering the first turbocharger air intake temperature to compensate for engine compartment temperature variations relative to actual ambient air temperature; and
    controlling the vehicle based on the estimated first ambient air temperature.

2. The method of claim 1 wherein the filtering comprises compensating for a vehicle operation which causes the engine compartment temperature variations relative to actual ambient air temperature.

3. The method of claim 2 wherein the filtering comprises adding a temperature filtering value to the first turbocharger air inlet temperature.

4. The method of claim 3 wherein the temperature filtering value is based on engine speed to compensate for engine compartment temperature variations due to driving the vehicle.

5. The method of claim 4 wherein the temperature filtering value is further based a fan usage time to compensate for engine compartment temperature variations due to fan operation.

6. The method of claim 1 further comprising updating the first filtered ambient air temperature estimate based on a temperature difference between the first filtered ambient air temperature estimate and a second filtered ambient air temperature estimate.

7. The method of claim 6 wherein the updating comprises adding a temperature update value to the first filtered ambient air temperature estimate.

8. The method of claim 7 the temperature update value limits increases to the first filtered ambient air temperature estimate if the second filtered ambient air temperature estimate is greater than the first filtered ambient air temperature estimate to limit unnatural increases in estimating ambient air temperature.

9. The method of claim 8 wherein the temperature increase is limited to a maximum percentage increase per wait time, the wait time corresponding to a period of time between sensing the first and the second turbocharger air inlet temperature.

10. The method of claim 6 further comprising storing the updated ambient air temperature estimate as a frozen ambient air temperature estimate if an engine load is greater than an engine load limit to compensate for engine compartment temperature variations due to the engine operating above the engine load limit.

11. The method of claim 10 further comprising storing the frozen ambient air temperature estimate only if the engine load is greater than the engine load limit for a period of time longer than a load limit interval.

12. The method of claim 11 further comprising storing a sensed barometric pressure occurring proximate in time to storing the frozen ambient air temperature estimate for use in adjusting the frozen ambient air temperature estimate according to changes in barometric pressure.

13. The method of claim 12 further comprising calculating a change in sensed barometric pressure, updating the frozen ambient air temperature estimate as a function of the change in sensed barometric pressure.

14. The method of claim 13 wherein updating the frozen ambient air temperature comprises increasing the frozen ambient air temperature estimate if the barometric pressure increases and decreasing the frozen ambient air temperature estimate if the barometric pressure decreases.

15. A system for controlling an engine by indirectly estimating ambient air temperature, the system comprising:
   means for determining a turbocharger air inlet temperature; and means for estimating ambient air temperature based on data received from the turbocharger air inlet temperature;
   means for filtering the estimate ambient air temperature to compensate for engine compartment temperature variations causing the turbocharger air inlet temperature to inaccurately represent actual ambient air temperature; and
   means for controlling engine operation based on the filtered ambient air temperature estimate.

16. A system for controlling an engine by indirectly estimating ambient air temperature, the system comprising:
   a sensor for sensing a turbocharger air inlet temperature; and
   an engine control module configured for:
      estimating ambient air temperature based on the turbocharger air inlet temperature,
      filtering the estimate ambient air temperature to compensate for engine compartment temperature variations causing the turbocharger air inlet temperature to inaccurately represent actual ambient air temperature; and
      controlling engine operation base on the filtered ambient air temperature estimate.

17. The system of claim 16 wherein filtering comprises adding a temperature filtering value to the first turbocharger air inlet temperature, the filtering value based on both an engine speed to compensate for engine compartment temperature variations due to driving the vehicle and a fan run time to compensate for engine compartment temperature variations due to fan operation.

18. The system of claim 16 further comprising storing the filtered ambient air temperature estimate as a frozen ambient air temperature estimate if an engine load is greater than an engine load limit to compensate for engine compartment temperature variations due to the engine operating above the engine load limit.

19. The system of claim 18 wherein the frozen ambient air temperature estimate is updated based on a change sensed barometric pressure.

20. The method of claim 19 wherein the frozen ambient air temperature is increased if the barometric pressure increases and decreased if the barometric pressure decreases.

* * * * *